United States Patent [19]

Shaw et al.

[11] Patent Number: 4,494,604

[45] Date of Patent: Jan. 22, 1985

[54] EXTRACTION OF ACIDIC MATERIALS FROM ORGANIC LIQUIDS AND USE THEREOF IN ENHANCED OIL RECOVERY

[75] Inventors: James E. Shaw; Paul R. Stapp, both of Bartlesville, Okla.

[73] Assignee: Phillips Petroleum Company, Bartlesville, Okla.

[21] Appl. No.: 508,640

[22] Filed: Jun. 28, 1983

[51] Int. Cl.$^3$ .............................................. E21B 43/22
[52] U.S. Cl. .................... 166/273; 166/275; 166/300; 208/232; 210/634
[58] Field of Search ............... 166/270, 273, 274, 275, 166/300, 305 R, 307; 252/8.55 D, 8.55 R; 208/230, 232; 210/634, 638

[56] References Cited

U.S. PATENT DOCUMENTS

| | | | |
|---|---|---|---|
| 3,921,714 | 11/1975 | Foster | 166/273 |
| 3,929,190 | 12/1975 | Chang et al. | 166/274 |
| 3,938,591 | 2/1976 | Ossip et al. | 166/275 |
| 3,981,361 | 9/1976 | Healy | 166/252 |
| 4,037,656 | 7/1977 | Cooper | 166/270 |
| 4,079,785 | 3/1978 | Hessert et al. | 166/273 |
| 4,085,799 | 4/1978 | Bousaid et al. | 166/270 |
| 4,125,156 | 11/1978 | Glinsmann | 166/252 |
| 4,147,638 | 4/1979 | Plummer | 252/8.55 D |
| 4,411,816 | 8/1983 | Yen et al. | 252/8.55 D |
| 4,414,120 | 11/1983 | Malloy et al. | 252/8.55 D |

*Primary Examiner*—Stephen J. Novosad
*Assistant Examiner*—William P. Neuder

[57] ABSTRACT

In accordance with the present invention acidic materials, preferably naturally-occurring carboxylic acids from crude oils and acids formed by the oxidation of components of crude oils, are extracted from organic liquids containing the same by contacting the organic liquid with an aqueous polar organic solvent solution of potassium hydroxide. The polar organic solvents are preferably solvents selected from the group consisting of OH substituted hydrocarbons, SO substituted hydrocarbons, $SO_2$ substituted hydrocarbons, $NH_2$, NHR and $NR_2$ substituted hydrocarbons, $CONH_2$, CONHR and $CONR_2$ substituted hydrocarbons and CN substituted hydrocarbons. The thus extracted acidic materials may be neutralized with an appropriate alkaline material to produce the corresponding salts thereof. In another aspect of the present invention the thus extracted acids or the salts thereof are utilized to recover oil from a subterranean oil reservoir by utilizing the same in conjunction with waterflooding operations, particularly an alkaline waterflooding technique or a surfactant waterflooding technique.

30 Claims, No Drawings

EXTRACTION OF ACIDIC MATERIALS FROM ORGANIC LIQUIDS AND USE THEREOF IN ENHANCED OIL RECOVERY

This invention relates to the extraction of acidic materials from organic liquids and the use thereof in enhanced oil recovery. In a more specific aspect the present invention relates to the extraction of acidic materials from crude oils and the utilization thereof in enhanced oil recovery techniques.

BACKGROUND OF THE INVENTION

Oil exists in subterranean formations or reservoirs in a wide variety of forms, in a wide variety of formations and under a wide variety of natural conditions. In most cases natural forces present in the reservoir permit the production of significant amounts of the oil by so-called primary recovery methods. Usually this is brought about by the fact that reservoir pressure, supplied by gas under pressure, either in solution in the oil or as a gas cap, water, etc. is sufficient to force the oil to the surface of the earth. In any event these so-called primary recovery methods are capable of recovering only minor portions of the original oil in place due to depletion of the natural forces and other factors. In some cases little or none of the oil can be produced by natural forces. Accordingly, a wide variety of supplemental or artifical recovery techniques have been employed and still more have been proposed in order to increase the recovery of oil from subterranean formations. If the artifical recovery technique is utilized in reservoirs having insufficient natural production forces it is often referred to as primary recovery and, if used immediately following discontinuance of primary recovery methods, such technique has been referred to as a secondary recovery technique. If a so-called secondary recovery technique is followed by another artifical recovery technique, the latter has often been referred to as tertiary recovery. However, the lines of demarcation among these three techniques have been obliterated to a certain extent and it is, therefore, best to refer to all such artifical recovery techniques, whether primary, secondary or tertiary, as "enhanced oil recovery" techniques. Irrespective of the name applied to the recovery technique, all such enhanced oil recovery techniques include the injection of a gaseous or a liquid fluid into one or more injection wells under a pressure sufficient to displace or drive at least a portion of the oil from the reservoir, i.e. above the reservoir pressure, and producing the thus displaced oil from one or more producing wells. Obviously, a wide variety of driving fluids or injection fluids and combinations thereof have been proposed. However, the basic drive fluids or injection fluids include air, natural gas, carbon dioxide, propane, steam, water, surfactants and polymers. Unfortunately, none of these materials is an ideal displacement fluid due to a number of factors which affect the amount of oil which can be recovered by enhanced oil recovery techniques.

It has long been recognized that the major factors which influence the amount of oil recovered by enhanced oil recovery techniques include the relative mobility of the reservoir oil and injected fluid, the wettability characteristics of the rock surfaces within the reservoir and the interfacial tension between the injected fluid and the reservoir oil.

Obviously, if plug-type flow of oil and displacing fluid from injection wells to production wells could be accomplished substantial amounts of the oil in place could be displaced. However, this is generally not accomplished because of the fact that most displacing fluids will travel faster through the reservoir than the oil because of adverse mobility ratios. While a rather simplistic explanation, the relatively low viscosity of gases, as opposed to the oil, causes the gas to follow paths of least resistance, with the result that the gas will channel through fractures and fissures, selectively pass through zones of higher permeability and in general contact a small area of the reservoir in passing from the injection well to the production well. In addition, gravity segregation of the injected gas and the oil causes the gas to rise to the top of the reservoir where it tends to ride over the top of the oil bank. Accordingly, while gases such as natural gas and air are usually readily available and relatively inexpensive, they are also relatively inefficient as displacing media under ordinary conditions. In addition, one must also consider the cost of compressing the gas to a pressure sufficient for displacement of the oil. On the other hand, liquids have a more favorable mobility ratio with respect to reservoir oil due primarily to their greater viscosity. Consequently, conventional water injection or waterflooding has been the most widely practiced enhanced oil recovery technique. However, the mobility ratio between water and reservoir oil is still generally poor. Accordingly, numerous modifications of conventional waterflooding have been proposed to overcome this problem. These include thickening the water with various materials, such as polymers, forming viscous water-oil emulsions by the use of surfactants, etc. Obviously, these thickening or emulsifying materials are expensive and cannot be used throughout the entire waterflood. Hence the thickening agent or emulsion is utilized only in that portion of the water in contact with the oil. An alternative is the injection of a small slug of polymer, generally having a viscosity greater than the viscosity of the oil, at the contact between the polymer and the oil, and a terminal viscosity, at the contact with the water, which is near that of the viscosity of water. Such graded concentration is usually logarithmic, from the viscosity of the reservoir oil to the viscosity of the water. In other variations, a thickening or viscosifying agent is preceded by one or more other displacing media and followed by water.

The wettability characteristics of the rock surfaces also affect displacement of oil by water. If the rock surfaces are oil wet, substantial amounts of the oil will adhere to the rock surfaces and resist displacement by the water. If the oil wettability of the rock surfaces can be altered either by decreasing the oil wettability or even reversing the wettability, to render the rock surface water wet, substantial improvement in oil displacement by water can be attained. Such reduction of oil wettability or reversal of wettability can also be accomplished by the utilization of surfactants. However, as previously discussed, such surfactants are expensive and therefore must be utilized in limited quantities, generally as a slug ahead of the water drive.

The interfacial tension between a displacing fluid and reservoir oil is primarily dependent upon the ability of the two materials to mix. As a result miscible replacement techniques have been developed. For example, if natural gas is compressed to a sufficiently high pressure, usually above about 3000 psi, the gas can be rendered miscible with the reservoir oil. However, in some cases, if the miscibility pressure is too high to be practical or the reservoir cannot withstand pressures of this magnitude, this process cannot be used. In addition the additional compression cost also adds to the cost of the project. Where applicable, however, this technique has proven quite effective. Similarly, at lower pressures, carbon dioxide can be rendered miscible with reservoir oils and miscible displacement can be carried out by displacing the oil with carbon dioxide. In addition to the advantage of the lower miscibility pressure, carbon dioxide has the advantage of a relatively high solubility in water. Consequently, techniques have been proposed in which a slug of carbon dioxide is followed by water or the carbon dioxide is dissolved in the water. At still lower pressures ethane and propane and mixtures thereof can be made miscible with reservoir oil. However, these materials, particularly propane, are expensive relative to the value of the oil displaced and accordingly can not be utilized in unlimited amounts. As a result the "propane slug process" has been developed in which a slug of propane is driven through the reservoir by gas, usually natural gas, under conditions such that the propane is miscible with the oil being displaced and with the driving gas. Again, while this technique is effective in appropriate reservoirs, utilization of gases as the drive fluid interjects the above-mentioned problems of mobility. Finally, under certain conditions, surfactants can be utilized in the miscible displacement of oil. At this point it should be recognized that the terms "miscible" and "miscibility", as they relate to enhanced oil recovery techniques, have been somewhat misused, for example by the use of terms such as "partial miscibility". However, what is generally meant by such terms is that one fluid is partially soluble in the other. Consequently, a more accurate definition of "miscible" or "miscibility", and the definition which will be utilized herein, is that the two fluids in question are mixable with each other in all proportions and of "solubility", where there is a limit to the amount of a material which is soluble in or will mix with a fluid. While miscibility between the reservoir oil and the displacing fluid can be said to be ideal to the extent that the oil-water interfacial tension is minimal, it is not necessary to obtain miscibility in order to reduce the oil-water interfacial tension and substantially improve displacement of oil by the drive fluid. Significant lowering of oil-water interfacial tension can be accomplished by the utilization of surfactants and highly effective immiscible displacement can be attained.

It is obvious from the above that the utilization of surfactants in enhanced oil recovery techniques has numerous advantages over the other techniques discussed. As previously indicated, the surfactant reduces the interfacial tension between a surfactant solution and reservoir oil and alters the oil wettability of the rock surfaces, thus substantially improving displacement of the oil. Secondly, since the surfactant solution is a liquid, it can be driven by water and the disadvantages of unfavorable mobility ratios, which are present when gases are used as drive fluid, are significantly reduced. Finally, enhanced oil recovery techniques utilizing surfactants can be utilized in reservoirs which have already been subjected to other recovery techniques, particularly where the reservoir has been produced to its economic limits by waterflooding. As a result, a substantial amount of research has been carried out in developing a wide variety of techniques utilizing surfactants and in improving the basic forms of these techniques. As previously indicated, because of the relative cost of surfactants, the surfactants are generally utilized in small amounts or in slug type operations in which the surfactant solution is driven through the reservoir by water.

The most basic of the surfactant techniques involves the injection of an aqueous surfactant solution, simply to reduce the oil-water interfacial tension. Such techniques are often referred to as "low tension waterflooding" techniques. Today one of the most promising low tension waterflooding techniques involves the injection of aqueous solutions of petroleum sulfonates, having a predetermined equivalent weight range, under controlled conditions of salinity. This basic technique is further improved by sequential injection of a protective slug, the surfactant slug, a mobility control slug and finally water. The protective slug is an aqueous solution of sodium chloride which is injected in order to displace reservoir water ahead of the subsequently injected surfactant slug. The protective slug is substantially free of divalent ions which would tend to precipitate the subsequently injected surfactant. The surfactant slug comprises an aqueous solution of petroleum sulfonates and contains sodium chloride in a concentration, typically between about 1.0 to 7.0 weight percent, which will promote the desired low interfacial tension between the injected water and the reservoir oil. The subsequently injected mobility control slug is a thickened water slug containing a viscosifier or thickening agent, such as a water soluble biopolymer or polyacrylamide. The mobility control slug is preferably of logarithmically graded concentration in order to provide an initial viscosity greater than the viscosity of the reservior oil and a terminal viscosity near that of water. Finally, the driving fluid may be water from any source, but is usually brine present in the reservoir with the oil. In addition to petroleum sulfonates, a wide variety of synthetic sulfonates and complex sulfonates derived from either petroleum or synthetic sources have been proposed to further improve the process and overcome other problems which exist in certain reservoir environments.

As previously indicated, surfactants may be utilized under conditions to produce miscible or immiscible displacement of the oil. In addition, such surfactants have been used in systems which do not form microemulsions and those which do form microemulsions. In recent years considerable research has been devoted to the latter systems.

The microemulsions which have been proposed have been selected from compositions in the single phase region of a ternary diagram. Such microemulsion systems can be either oil-external microemulsions or water-external microemulsions. When such microemulsion systems are used, it is believed that the initial stages of oil recovery involve an efficient miscible displacement with subsequent immiscible displacement, upon the breaking down of the microemulsion into multiple phases due to dilution of the microemulsion with crude oil and reservoir water at its leading edge and dilution with the aqueous drive fluid at its trailing edge. Hence, optimization of such microemulsion surfactant systems is approached in terms of minimization of the multiphase region in the phase diagram so as to prolong miscible displacement with low interfacial tensions in the multiphase regions to thereby enhance immiscible displacement. From a practical standpoint, however, the development of effective microemulsion systems which can economically recover oil from a subterranean formation suffers from certain drawbacks in that it is difficult to maintain miscible displacement and it is difficult to obtain the low interfacial tensions necessary to provide effective immiscible displacement after miscible displacement ceases.

Surfactant systems have been developed which form microemulsions on contact with the reservoir oil. For example, U.S. Pat. No. 3,373,809 discloses recovering oil through the formation of a microemulsion formed in situ by injecting a surfactant system. This patent is based on the formation of a single phase microemulsion system with the reservoir oil by injecting a surfactant system to form the microemulsion system in situ. However, in order to achieve the desired results, extremely high concentrations of surfactant must be utilized. Such quantities of surfactant are usually in excess of about 7% to 15% by weight so as to provide a composition within the single phase region of a ternary diagram and, as such, can easily exceed the value of the oil recovered. Accordingly, it is becoming well recognized that it is impractical from an economic standpoint to maintain such a highly concentrated surfactant composition in the reservoir, which will remain effectively miscible throughout the lifetime of the operation, as proposed by the above patent and others.

Recent work has led to the suggestion of injecting microemulsion systems wherein the microemulsion phase is immiscible with the resident fluids in the reservoir. For example, U.S. Pat. No. 3,885,628 proposes to form a multiphase microemulsion system above ground by mixing oil, brine and surfactant and injecting at least the immiscible microemulsion phase. In some cases this patent suggests injecting one or more of the other phases, which exist in equilibrium with the microemulsion phase along with the immiscible microemulsion phase. Later work, as set forth in U.S. Pat. No. 3,981,361, describes procedures for producing surfactant systems above ground which are injected as an immiscible microemulsion. In this case emphasis is placed on the injection of the single immiscible surfactant-rich microemulsion phase. Also, U.S. Pat. No. 3,938,591 discusses the injection of immiscible microemulsion systems which resist uptake of oil and water into the immiscible microemulsion phase. In the last three techniques described, there is the obvious disadvantage of requiring the injection of a composition containing substantial amounts of oil which, of course, adds to the cost of the injected composition. In addition, there is the problem of achieving the optimum system for a given oil, since it turns out that different oils behave differently.

In order to overcome the above-mentioned and other difficulties encountered in the prior art use of surfactants in oil recovery, U.S. Pat. Nos. 4,079,785 and 4,125,156, which are incorporated herein by reference, disclose that an effective immiscible surfactant drive can be carried out by injecting a slug of surfactant solution comprising a surfactant, an electrolyte, water and, optionally, a cosurfactant to form a multiphase system in situ in the reservoir which comprises; at least two different regions, for example, an oil-rich region and a microemulsion region. The latter patent points out that best results are obtained when three different multiphase regions are formed, namely, a microemulsion, in equilibrium with an oil phase, a microemulsion in equilibrium with both an oil phase and a water phase and a microemulsion in equilibrium with a water phase. It is pointed out in this patent that among the variables which affect the three-phase region in which a particular system will partition are salinity, oil type, surfactant average equivalent weight, cosurfactant type and temperature. The patent also goes on to point out that, if all variables are fixed except the salinity, the system will shift from a microemulsion in equilibrium with an oil phase to a microemulsion in equilibrium with both an oil phase and a water phase to a microemulsion system in equilibrium with a water phase, as the salinity increases from zero. Finally, the patent sets forth a simple procedure which can be carried out in a laboratory to establish the system of water, electrolyte, surfactant and, optionally, cosurfactant and the proportions thereof which will be most effective for enhancing oil recovery when injected into the reservoir of interest.

While recent emphasis has been placed upon the use of petroleum sulfonates in surfactant waterflooding, numerous other surfactants have been proposed for use. For example, long chain organic acids, such as oleic, palmitic and stearic acids and the corresponding soaps have been suggested. Likewise sodium salts of so-called "tar acids", formed by adding to water-soluble tar acids, of the acid wash in petroleum refining, the alkaline wash liquids from the purification of crude oil fractions. Obviously, the latter proposal constitutes an effort to reduce the cost of the surfactant.

Also, while the previously mentioned surfactants are relatively inexpensive and the amounts utilized are small compared with the amount of drive water injected, the volume of surfactant necessary makes the cost of the surfactant a major factor. Consequently, a number of techniques have been proposed for reducing the cost of the surfactant.

One such technique is referred to as "caustic" or "alkaline" waterflooding. In this technique, an aqueous solution of an alkali metal or ammonium hydroxide or carbonate is injected into the reservoir in order to neutralize organic acids present in the reservoir oil and produce the corresponding alkali metal or ammonium salts. Thus, the surfactant is formed in situ. Alkaline waterflooding has been proposed in various recovery mechanisms to lower the interfacial tension between the reservoir oil and the injected water, to alter or even reverse the wettability of the reservoir rock or for the purpose of mobility control by the formation of a relatively viscous oil and water emulsion. In a variation of this technique, an aqueous alkaline solution is employed in which the alkalinity and monovalent salt salinity of the solution are controlled within defined ranges in order to result in low oil-water interfacial tensions which enhance the displacement of the oil. A thickened water slug may then be used for the purpose of mobility control following the injection of the alkaline solution.

The relative efficiency of an alkaline waterflood depends to some extent upon the total acid content of the reservoir oil. Accordingly, in some cases, insufficient naturally-occurring organic acids are present. Therefore variations of this procedure have been proposed in which air, peroxides or other oxidizing agents are injected into the reservoir in order to oxidize certain constituents of the oil in situ and form additional organic acids. Alternatively, a peroxidized oil bank may be injected or high molecular weight acids may be added to an injected oil bank. In any event, the aqueous alkaline solution is then injected in order to form the sodium salts of the naturally occurring organic acids, the added acids and/or those formed from the constituents of the oil in situ.

Another technique for reducing the cost of surfactants and one which can be utilized where insufficient naturally-occurring organic acids are present in the reservoir oil, is the extraction of organic acids from materials containing the same, particularly from the reservoir oil itself, at the surface of the earth followed by neutralization to form salts or injection of the acid followed by injection of an aqueous alkaline solution to form the salts in situ. This surface extraction of acidic materials is, of course, advantageous to the extent that extracted acids can be accumulated to thereby inject the optimum amount into the formation rather than relying upon the acid content of the oil volume immediately adjacent the injection well. However, present techniques for extracting the acids from the acid-containing material leave much to be desired. One technique involves passing the oil through a solid ion exchange agent which adsorbs the acids by ion exchange. While high percentages of the acid present in the oil can be extracted by this technique, it is expensive and cumbersome. Solid ion exchange agents, usually used, are expensive and lose their effectiveness in time and as a result of the presence of contaminating ions in the oil. In addition, once the acids are adsorbed by the ion exchange resin they must be removed by passing an eluent through the resin to reverse the exchange and elute the acids therefrom. When the exchange capacity of the resin deteriorates it is also necessary to regenerate the resin and often precondition the resin, by an ion exchange mechanism, for further use. Eventually, however, where regeneration and renewal of the exchange capacity are ineffective the resin must be replaced. In another standard technique the oil is extracted with an aqueous solution of sodium hydroxide or an aqueous ethanol solution of sodium hydroxide. While this liquid-liquid extraction technique is simple and relatively inexpensive, the recovery of acids is extremely low, particularly by comparison to the ion exchange technique. Accordingly, a simple and inexpensive technique for recovering high percentages of acids in such acid-containing materials is desirable.

SUMMARY OF THE INVENTION

It is therefore an object of the present invention to provide an improved method for the extraction of acidic materials from organic liquids containing the same which overcomes the above-mentioned and other problems of the prior art. Another object of the present invention is to provide an improved method for the extraction of acidic materials from organic liquids containing the same which is simple and inexpensive. A further object of the present invention is to provide an improved method for the recovery of oil from subsurface earth formations which overcomes the above-mentioned and other problems of the prior art. Another and further object of the present invention is to provide an improved method for the recovery of oil from subsurface earth formations utilizing a surfactant. A still further object of the present invention is to provide an improved method for the recovery of oil from subsurface earth formations which utilizes an inexpensive source of surfactants. Yet another object of the present invention is to provide an improved method for extracting acidic materials from organic liquids containing the same and utilizing such extracted acidic materials or the salts thereof for the recovery of oil from subsurface earth formations. A still further object of the present invention is to provide an improved method for extracting acidic materials from organic liquids, containing the same and the utilization of the thus extracted acidic materials or the salts thereof for the recovery of oil from subsurface earth formations which is simple and inexpensive in operation. Yet another object of the present invention is to provide improved methods for extracting acidic materials from crude oils and utilizing the thus extracted acidic materials or the salts thereof for the recovery of oil from subsurface earth formations by surfactant waterflooding techniques. A further object of the present invention is to provide an improved method for extracting acidic materials from organic liquids containing the same and utilizing the thus extracted acidic materials or the salts thereof in a surfactant waterflooding technique for the recovery of oil from subsurface earth formations. Another and further object of the present invention is to provide an improved method for extracting acidic materials from organic liquids containing the same and utilizing the thus extracted acidic materials or the salts thereof in an alkaline waterflooding technique for the recovery of oil from subsurface earth formations. These and other objects of the present invention will be apparent from the following description.

In accordance with the present invention acidic materials, preferably naturally-occurring carboxylic acids from crude oils and acids formed by the oxidation of components of crude oils, are extracted from organic liquids containing the same by contacting the organic liquid with an aqueous polar organic solvent solution of potassium hydroxide. The polar organic solvents are preferably solvents selected from the group consisting of OH substituted hydrocarbons, SO substituted hydrocarbons, $SO_2$ substituted hydrocarbons, $NH_2$, NHR and $NR_2$ substituted hydrocarbons, $CONH_2$, CONHR and $CONR_2$ substituted hydrocarbons and CN substituted hydrocarbons. In another aspect of the present invention the thus extracted acids or the salts thereof are utilized to recover oil from a subterranean oil reservoir by utilizing the same in conjunction with waterflooding operations, particularly an alkaline waterflooding technique or a surfactant waterflooding technique.

DESCRIPTION OF THE PREFERRED EMBODIMENTS

In accordance with the present invention it has been found that acidic materials, particularly carboxylic acids, can be extracted from organic liquids containing the same, preferably crude oils or oxidized crude oils, by contacting the organic liquid with an aqueous, polar organic solvent solution of potassium hydroxide to produce an aqueous phase containing the potassium salt of the acidic material. By this technique substantially all of the acids present in the organic liquid can be extracted. This is approximately twice as great as that recoverable by the corresponding solutions of sodium hydroxide, as suggested in the prior art.

Organic liquids containing acidic materials which can be treated in accordance with the present invention include any organic material, particularly hydrocarbon oils and hydrocarbon mixtures containing acidic components including phenols, hydrocarbon mixtures such as crude oils, hydrocarbon oxidates, refinery streams, industrial byproduct streams and the like.

The acidic materials include any of the various acid-acting compounds, such as carboxylic acid, phenols, etc.

The polar organic solvents can include hydrocarbon polar solvents containing O, S or N, more specifically hydrocarbon polar solvents containing OH, SO, $SO_2$, $NH_2$, NHR, $NR_2$, $CONH_2$, CONHR, $CONR_2$ or CN functional groups, preferably solvents of this class containing from about 1 to about 12 carbon atoms. Still more specifically, the polar organic solvent can include alcohols and glycols containing from 1 to 4 carbon atoms, monoethoxylated derivatives of alcohols having 3 to 8 carbon atoms diethoxylated derivatives of alcohols containing 5 to 12 carbon atoms, sulfoxides or sulfones containing 2 to 5 carbon atoms, amines having 3 to 6 carbon atoms, amides having 1 to 4 carbon atoms or nitriles having 2 to 4 carbon atoms.

The polar organic solvent content of the aqueous, polar organic solvent solution can contain from about 20 to about 95% by volume of polar organic solvent, preferably about 60 to about 80% by volume of polar organic solvent and in the case of methanol, the concentration of the methanol can be as high as 100% by volume.

The molecular weight range of acids extracted in accordance with the present invention will be from about 200 to about 1000, and preferably between about 300 and 700. It has been found in accordance with the present invention that this molecular weight range of acids can be extracted from crude oils containing carboxylic acids and further that carboxylic acids of this molecular weight range and neutralization products of such carboxylic acids are highly effective in the recovery of oil from subsurface earth formations by the use of such acids and neutralization products thereof, particularly alkaline waterflooding and surfactant waterflooding.

In accordance with a further aspect of the present invention appropriate hydrocarbon liquids can be treated with an oxidizing agent, such as air, peroxides such as hydrogen peroxide, hypochlorites, sulfuric acid, nitric acid, etc. to produce carboxylic acids from hydrocarbon components of the hydrocarbon liquid. Thereafter, the thus produced acidic materials may be extracted from the reaction mixture by contact with aqueous, polar organic solvent solutions of potassium hydroxide in accordance with the present invention.

The amounts of potassium hydroxide to be utilized in the aqueous, polar organic solvent solution can be readily determined by one skilled in the art and can range anywhere from an effective amount to about 10% or more by weight. Selection of an appropriate potassium hydroxide concentration can be aided by determining the acid number of the organic liquid to be extracted. In any event, the preferred concentration of potassium hydroxide is between about 1 and 10% by weight and still more preferably between about 1% to about 5% by weight of potassium hydroxide.

The thus extracted acidic materials obtained in accordance with the present invention may be utilized in any of the known alkaline or surfactant waterflooding techniques. In these cases the relative amounts of acidic materials or neutralization products thereof to be utilized are well-known to those skilled in the art as are the operating techniques and variations of these techniques.

A preferred surfactant waterflooding technique is the immiscible surfactant drive technique mentioned in the introductory portion hereof. Such a process, as well as the technique for determining the relative amounts of components of the surfactant solution and other parameters are set forth in detail in U.S. Pat. Nos. 4,255,270 and 4,330,418, which are incorporated herein by reference, in addition to U.S. Pat. Nos. 4,079,785 and 4,125,156, previously mentioned. Briefly, a slug of a surfactant solution comprising a surfactant, an electrolyte, water, and, optionally, a co-surfactant are injected into the subsurface earth formation to form a multiphase system in situ in the reservoir, which comprises at least two different regions, for example, an oil-rich region and a microemulsion rich region. For best results three different multiphase regions are formed, namely, a microemulsion in equilibrium with an oil phase, a microemulsion in an equilibrium with both an oil and a water phase, and a microemulsion in equilibrium with a water phase. The surfactant will generally be utilized in an amount of between about 1 to 7, and preferably 2 to 5 weight % active ingredient, based on the weight of the water. The water plus inorganic salt comprises about 85% or more of the total mixture. Suitable inorganic salts include sodium sulfate, sodium nitrate, sodium chloride (which is preferable due to its availability and cost), sodium tripolyphosphate, sodium carbonate, etc. but the monovalent metallic salts, particularly sodium chloride are preferred. The inorganic salts are present in the water in an amount within the range of about 250 to 100,000, more preferably 500 to 40,000, and still more preferably 5000 to 25,000 parts per million total dissolved solids. Other electrolytes may also be present in combination with the sodium chloride.

The cosurfactant, in an injection solution, may be a polar organic compound, such as an an alcohol having 1–12 carbon atoms per molecule, a primary, secondary, or tertiary amine having 1–12 carbon atoms per molecule, phenol or a phenol having a side chain of 1–10 carbon atoms per molecule, a ketone having 3–12 carbon atoms per molecule, a mercaptan having 2–12 carbon atoms per molecule, a glycol having 2–18 carbon atoms per molecule, a glycerol having 3–18 carbon atoms per molecule, an aldehyde having 2–12 carbon atoms per molecule, an amide having 1–12 carbon atoms per molecule, a nitrile having 2–12 carbon atoms per molecule, and a sulfoxide having 3–12 carbon atoms per molecule. Also, the cosurfactant can be an alcohol, phenol, amine, mercaptan, glycol, or amide of 1–20 carbon atoms per molecule which has been ethoxylated or propoxylated with an average of 1–12 ethylene oxide or propylene oxide units per molecule. The cosurfactant preferably has a solubility in water within the range of about 0.5 to 20, more preferably 2 to 10 grams per 100 grams of water at 20° C. Preferred materials are $C_4$ to $C_7$ alcohols or mixtures thereof. Most preferred are $C_4$ and $C_5$ alcohols having a solubility within the range stated above. Isobutyl alcohol with a solubility of 9.5 grams per 100 grams of water is particularly suitable. The cosurfactant will generally be used in amounts within the range of about 1 to 7, preferably 1.5 to 4 weight % based on the weight of the water.

Example I demonstrates the greater effectiveness of an aqueous alcoholic potassium hydroxide solution as compared to an aqueous alcoholic sodium hydroxide solution for the extraction of high molecular weight carboxylic acids from systems consisting essentially of oils. The carboxylic acids in a crude oil (A) were also separated by ion exchange since this extraction technique is known to extract substantially all of the acidic materials present in organic liquids.

EXAMPLE I

Individual 500 g samples of crude oil A were subjected, respectively, to aqueous alcoholic KOH extraction, aqueous alcoholic NaOH extraction and ion exchange chromatography for the recovery of carboxylic acids.

Aqueous Alcoholic KOH Extraction

A 500 g sample of crude oil A was dissolved in one liter of pentane and this mixture was extracted successively with five 400 ml aliquots of 1 weight percent KOH in aqueous alcohol (70:30 v/v ethanol/water). The combined aqueous alcoholic extract was washed with two 300 ml portions of pentane. The combined pentane extracts were back-extracted with a 200 ml aliquot of the aqueous alcohol solution and all of the aqueous alcohol extracts were combined. The combined aqueous alcoholic extracts were stripped to one-half their original volume and the concentrate was acidified to a pH of 3 with dilute hydrochloric acid solution. This acidified solution was successively extracted three times with 500 ml, 200 ml and 200 ml portions of ether. The ether extracts were combined, washed three times with 100 ml portions of water and finally with one 100 ml portion of saturated aqueous sodium chloride. The ether phase was separated, dried over anhydrous sodium sulfate and stripped to 4.0 g of residue. This residue was characterized by determination of a neutralization equivalent (N.E. 0.95 meq/gram). The total milliequivalents of acids recovered from 500 g of crude oil A was 3.8 (4 g acid×0.95 meq/g acid).

Aqueous Alcoholic NaOH Extraction

The same procedure as used above was carried out with aqueous alcoholic NaOH in place of aqueous alcoholic KOH. A 3.7 g residue of acids was recovered and exhibited a neutralization equivalent of 0.55 meq/g. The total milliequivalents of acid recovered from 500 g of crude oil A was about 2 (0.55 meq/g×3.7 g).

Ion Exchange Chromatography

A column elution chromatography tube measuring approximately 90 cm×5 cm was filled with distilled water and then a weakly basic ion exchange resin (AMBERLYST A-21, a trademark of Rohm & Haas) was added to a height of approximately 45 cm. The resin packing was then successively washed with 10 liters of distilled water, 8 liters of 2% aqueous NaOH and then again with distilled water until the column effluent was neutral. After the passage of 7 liters of methanol through the column, a solution of 1800 grams of crude oil A in 3 liters of 2:1 v/v toluene/ethanol was passed through the column twice. The column was then eluted successively with 14 liters of a 2:1 v/v mixture of toluene/methanol before a final elution with 13 liters of 2:2:1 v/v/v mixture of toluene/methanol/acetic acid. The latter eluate was stripped to 9.8 grams of product.

The above 9.8 g product sample was dissolved in a mixture of 20 ml ethanol and 25 ml toluene for additional elution column chromatography. An elution column chromatography tube measuring approximately 90 cm×2.5 cm was filled with distilled water and then a weakly basic ion exchange resin (AMBERLYST A-21) was added to a height of approximately 60 cm. The resin packing was then successively washed with 2 liters of distilled water, 1.5 liters of 2% aqueous sodium hydroxide and then again with distilled water until the column effluent was neutral. The column was finally washed with 1.2 liters of absolute ethanol and then 1 liter of a 2:1 v/v mixture of toluene and ethanol before introducing the ethanol/toluene solution containing the 9.8 g sample of product.

The product sample in solution was placed on top of the resin packing and allowed to stand for about 15 minutes before successively eluting the column with 2.3 liters of a 2:1 v/v mixture of toluene/ethanol and 2.2 liters of a 2:2:1 v/v/v mixture of toluene/ethanol/acetic acid. The latter eluate was distilled to dryness and the residue slurried with toluene and heptane to remove most of the acetic acid. The residue was then finally stripped of volatile contaminants on a rotary evaporator to give 8.5 g of product. This material possessed a neutralization equivalent of 1.7 meq/g. The total milliequivalents of acids recovered from 1800 g crude oil A was about 14.45 (1.7×8.5). This corresponds to about 4 milliequivalents of acid from each 500 g portion of crude Oil A (see Table I).

The results are summarized in Table I.

TABLE I

| Recovery of Acids from Crude Oil A | | | |
|---|---|---|---|
| Run No. | Method | Type of Run | Milliequivalents of Acid Recovered |
| 1 | Aqueous Alcoholic KOH | Invention | 3.8 |
| 2 | Aqueous Alcoholic NaOH | Control | 2.0 |
| 3 | Ion Exchange Chromatography | Control | 4.0 |

Example II gives some characterization data on the carboxylic acids recovered crude oil A in regard to approximate average gram equivalent weight and average gram molecular weight. The carboxylic acids were recovered by the ion exchange chromatography procedure described in Example I.

EXAMPLE II

The approximate average molecular weights of the recovered carboxylic acids were determined by the conventional step-wise sequence: (1) lithium aluminum hydride (LiAlH$_4$) reduction of the carboxylic acid groups to primary alcohol groups; (2) conversion of the primary alcohols to p-toluenesulfonate esters with toluenesulfonyl chloride (TsCl), and (3) lithium aluminum hydride (LiAlH$_4$) reduction of the p-toluenesulfonate esters of (2) to produce hydrocarbons. The average molecular weight of the hydrocarbons obtained by the above sequence was about 530 (molal freezing point depression method). Since no carbon skeletal rearrangements occur in the above sequence, the 530 value corresponds to an approximate average molecular weight of 560 for the recovered acids assuming the predominance on the average of monocarboxylic acids. The average equivalent weight of the carboxylic acids recovered by the ion exchange procedure was determined to be about 588 (neutralization equivalent: 1.7 meq/g acid).

The following examples describe a variety of systems which employ the inventive aqueous, alcoholic KOH extraction method.

EXAMPLE III

A charge of 150 g topped crude oil B, 600 g aqueous 5% sodium hypochlorite solution, 6 g sodium carbonate and 0.3 g ruthenium trichloride 3-hydrate was stirred in a glass reaction vessel at ambient temperature for a period of 48 hours. During the reaction period the stirred mixture remained black in color and never exhibited an increase in viscosity. The reaction mixture was combined with 300 ml of 5 percent aqueous hydrochloric acid and 400 ml of ether before transferring into a separatory funnel for extraction. The resulting aqueous layer (pH was about 3) was extracted with an additional 400 ml portion of ether and the ether extracts were combined and washed with four 50–100 ml portions of water. The ether phase was separated, dried over anhydrous sodium sulfate and stripped of volatiles to give 140.3 g oily residue (neutralization equivalent 0.18 meq/g).

The above residue was dissolved in 400 ml pentane and thoroughly mixed with an aqueous ethanolic KOH solution prepared by dissolving 7 g (125 meq KOH) in a mixture of 150 ml water and 350 ml ethanol. This mixture was separated into two phases and the upper pentane phase was successively extracted with five 200 ml aliquots of 1% KOH in 70% v/v (ethanol/water). The alkaline extracts were combined and washed twice with 100 ml portions of pentane. The combined KOH extracts were concentrated to one-half their original volume. This mixture was acidified with 6M aqueous hydrochloric acid and extracted with two 400 ml portions of ether. After washing with three 100 ml portions of water, the combined ether extracts were separated and dried over anhydrous sodium sulfate. The dried ether extract was stripped of volatiles to give 7.2 g of residue (neutralization equivalent 2.7 meq/g). Thus, the 7.2 g of residual oil contained 19.44 meq of acid.

The combined pentane extracts were washed two times with 75 ml portions of water, the pentane phase was separated, dried over anhydrous sodium sulfate and evaporated to 121 g of residual oil (neutralization equivalent 0.02 meq/g). Thus, the 121 g of residual oil contained 2.42 meq of acid.

EXAMPLE IV

A 1-liter round-bottomed flash fitted with a water cooled reflux condenser and equipped with a magnetic stirring device was charged with 200 g topped crude oil B, 500 ml 5 percent sulfuric acid solution and 50 g sodium chlorate. The stirred reaction mixture was boiled for 24 hours, cooled to room temperature and combined with a mixture of 250 ml cyclohexane and 250 ml toluene. The organic layer was separted and extracted successively with four 250 ml portions of 3% KOH in 70% ethanol/water (v/v). The combined alkaline extracts were extracted with a single 200 ml portion of a 1:1 v/v mixture of cyclohexane and toluene. The organic phase was separated and stripped to 180 g of residual oil (neutralization equivalent 0.004 meq/g). Thus, the 180 g of residual oil contained about 0.7 meq of acid.

The aqueous, alcohol alkaline extracts were combined and concentrated on a rotary evaporator before acidifying the stripped material to a pH of 2 with 20% aqueous hydrochloric acid. The acidified mixture was successively extracted with four 250 ml aliquots of ether. The ether extracts were combined, washed successively with two 100 ml portions of water, separated and dried over anhydrous sodium sulfate. The dried ether extract was concentrated on a rotary evaporator to give 18.9 g of an oily residue (neutralization equivalent 2.5 meq/g). Thus, the 18.9 g of residual oil contained about 47 meq of acid.

EXAMPLE V

A charge of 149.6 g topped crude oil B, 300 ml water and 225 ml of concentrated nitric acid was placed in a 1-liter round-bottomed flask and stirred 14 hours at ambient temperature. The reaction vessel was fitted with water-cooled condenser, magnetic stirring device, and boiled for 8 hours. The evolution of $NO_2$ was evident. The reaction mass was cooled to ambient temperature, combined with 250 ml water and 500 ml methylene chloride. This mixture was thoroughly agitated by shaking in a separatory funnel and the layers were separated. The organic phase was filtered to remove charred material and washed successively with 200 ml portions of water. The organic phase was concentrated on a rotary evaporator to give a residual oil weighing 163 g (neutralization equivalent 1.5 meq/g). Thus, the 163 g of residual oil contained 244.5 meq of acid.

A 120 g sample of the above residual oil was dissolved in 500 g crude oil B and 500 ml of toluene. This mixture was extracted successively with six 400 ml portions of 1% KOH in 70/30 v/v ethanol/water. The combined aqueous alcoholic extracts were filtered and concentrated on a rotary evaporator to a dark-colored solution. This solution was acidified to a pH of about 2 with aqueous hydrochloric acid and then extracted repeatedly with ether. The combined ethereal extracts were concentrated on a rotary evaporator to a dark-colored viscous oil. This oil was taken into 800 ml of 3% KOH in 70/30 v/v ethanol/water before extracting with 250 ml pentane. The pentane layer was separated and back-extracted with 70/30 v/v ethanol/water. The aqueous alcohol extracts were combined, acidified to a pH of about 2 with aqueous hydrochloric acid and extracted with ether. The ethereal extracts were washed successively with three 100 ml portions of water, separated, and concentrated on a rotary evaporator to give 54.7 g of oil (neutralization equivalent 2.7 meq/g). Thus, the 54.7 g of oil contained above 148 meq of acid.

EXAMPLE VI

A charge of 200 g crude oil B, 200 ml distilled water and 50 ml of 30% aqueous hydrogen peroxide was placed in a 1-liter round-bottomed flask fitted with a water-cooled reflux condenser and magnetic stirring device. The mixture was boiled 24 hours, cooled to ambient temperature and charged with an additional 50 ml of 30% aqueous hydrogen peroxide. Reflux was resumed and continued for 48 hours. The reaction mass was cooled to ambient temperature and charged with an additional 50 ml of 30% aqueous hydrogen peroxide. Reflux was resumed and continued for 72 hours. The reaction mixture was cooled to ambient temperature and testing showed residual peroxide in the aqueous phase. A small amount of 5% palladium-on-carbon was added to the reaction mass and reflux was continued for 24 hours to destroy the residual peroxide. The reaction mixture was cooled to ambient temperature, combined with 500 ml of a 1:1 v/v mixture of toluene/cyclohexane, and the phases were separated. The organic phase was separated and extracted successively with four 250 ml portions of 3% KOH in 70/30 v/v ethanol/water. The combined aqueous alcohol extracts were extracted one time with 200 ml of a 1:1 v/v mixture of toluene/cyclohexane. The combined toluene/cyclohexane extracts were concentrated on a rotary evaporator to give 159.3 g of oil (neutralization equivalent 0.02 meq/g). Thus, the 159.3 g of residual oil contained about 3 meq of acid. The combined aqueous alcohol extracts were concentrated on a rotary evaporator and the residue was acidified to a pH of about 2 with aqueous hydrochloric acid. The resulting precipitated solid was collected on a Buchner funnel, washed with water and air-dried to 47.6 g of black solid (neutralization equivalent 2.2 meq/g). Thus, the 47.6 g of black solid contained about 105 meq of acid.

EXAMPLE VII

A charge of 480 g of refinery extract oil, 108 g of maleic anhydride and 900 ml of chlorobenzene was placed in a 2-liter round-bottomed flask fitted with a $\frac{3}{4}"\times 12"$ unpacked distillation column and equipped with a magnetic stirring device. The mixture was maintained at reflux for a period of 168 hours. A 500 ml portion of chlorobenzene was distilled off and the reaction mass was cooled to ambient temperature. The cooled reaction mixture was concentrated on a rotary evaporator to remove chlorobenzene and some of the unchanged maleic anhydride. Residual maleic anhydride was sublimed at 100° C./0.2 mm over a period of 14½ hours. The residual material weighed 545.1 g (neutralization equivalent 1.3 meq/g). Thus, the 545.1 g sample contained about 710 meq of acid.

A 369.7 g portion of the above sample was dissolved in 1500 ml of a 1:1 v/v mixture of toluene/cyclohexane and extracted successively with 650 ml portions of 5% KOH in 70/30 v/v ethanol/water. The combined aqueous alcoholic extracts were extracted one time with a 1:1 v/v mixture of toluene/cyclohexane. Concentration of all the toluene/cyclohexane extracts on a rotary evaporator gave 306.3 g of oil (neutralization equivalent 0.001 meq/g). Thus, this 306.3 g of oil contained about 0.3 meq of acid.

After concentrating the combined aqueous alcoholic extracts on a rotary evaporator, the residue was acidified to a pH of about 2 with aqueous hydrochloric acid and a black precipitate formed. The precipitate was collected on a Buchner funnel, washed with water and air-dried to give 64 g of a black solid (neuteralization equivalent 2.5 meq/g). Thus, this 64 g sample of black solid contained about 160 meq of acid.

While specific materials, equipment and modes of operation have been set forth above, it is to be understood that these specific recitals are by way of illustration and to set forth the best mode in accordance with the present invention only and are not to be considered limiting and that substitutes, equivalents, variations and modifications thereof will be apparent to one skilled in the art without departing from the present invention.

What is claimed is:

1. A method for extracting acidic materials from an organic liquid containing the same comprising:
contacting at least one organic liquid, selected from the group consisting of (1) organic liquids naturally containing said acidic materials, and (2) organic liquids which have been contacted with an oxidizing agent under conditions sufficient to produce said acidic materials, with an aqueous, polar organic solvent solution of potassium hydroxide in an amount and under conditions sufficient to produce an aqueous phase containing potassium salts of thus extracted acidic materials.

2. A method in accordance with claim 1 wherein the polar organic solvent is an organic material containing atoms selected from the group consisting of oxygen, sulfur, and nitrogen, or combinations thereof in substituent groups.

3. A method in accordance with claim 2 wherein the polar organic solvent contains from 1 to 12 carbon atoms.

4. A method in accordance with claim 1 wherein the polar organic solvent contains a functional group selected from the group consisting of OH, SO, $SO_2$, $NH_2$, NHR, $NR_2$, $CONH_2$, CONHR, $CONR_2$ and CN.

5. A method in accordance with claim 4 wherein the polar organic solvent contains from 1 to 12 carbon atoms.

6. A method in accordance with claim 4 wherein the polar organic solvent contains a functional group selected from the group consisting of OH and has from 1 to 12 carbon atoms; SO and $SO_2$ and has 2 to 5 carbon atoms; $NH_2$, NHR and $NR_2$ and has from 3 to 6 carbon atoms; $CONH_2$, CONHR and $CONR_2$ and has 1 to 4 carbon atoms; and CN and has 2 to 4 carbon atoms.

7. A method in accordance with claim 4 wherein the polar organic solvent is selected from the group consisting of alcohols, glycols, monoethoxylated derivatives of alcohols, diethoxylated derivatives of alcohols, sulfoxides, sulfones, amines, amides and nitriles.

8. A method in accordance with claim 4 wherein the polar organic solvent is selected from the group consisting of alcohols, and glycols having from 1 to 4 carbon atoms, monoethoxylated derivatives of alcohols having from 3 to 8 carbon atoms, diethoxylated derivatives of alcohols having 5 to 12 carbon atoms, sulfoxides and sulfones having 2 to 5 carbon atoms, amines having 3 to 6 carbon atoms, amides having 1 to 4 carbon atoms, and nitriles having 2 to 4 carbon atoms.

9. A method in accordance with claim 1 wherein the organic liquid is a crude oil.

10. A method in accordance with claim 1 wherein the acidic materials are carboxylic acids.

11. A method for recovering oil from a subsurface earth formation containing the same comprising;
(a) contacting at least one organic liquid, selected from group consisting of (1) organic liquids naturally containing said acidic materials, and (2) organic liquids which have been contacted with an oxidizing agent under conditions sufficient to produce said acidic materials, with an aqueous, polar organic solvent solution of potassium hydroxide in an amount and under conditions sufficient to produce an aqueous phase containing potassium salts of the thus extracted acidic materials, and
(b) contacting said subsurface earth formation with the thus extracted acidic materials or salts thereof in conjunction with an aqueous displacing medium under conditions to displace said oil.

12. A method in accordance with claim 1 wherein the organic liquid is a crude oil.

13. A method in accordance with claim 12 the crude oil is a crude oil from the subsurface formation from which oil is being recovered.

14. A method in accordance with claim 12 wherein the organic liquid containing acidic materials is prepared by contacting an organic liquid with an oxidizing agent under conditions to produce said acidic materials from hydrocarbon components of said organic liquid.

15. A method in accordance with claim 14 wherein the organic liquid is a crude oil.

16. A method in accordance with claim 15 wherein the crude oil is an oil from the subsurface formation from which oil is being recovered.

17. A method in accordance with claim 1 wherein the thus produced acidic materials are neutralized, the thus produced neutralization products are injected into the oil reservoir and water is thereafter injected into the oil reservoir.

18. A method in accordance with claim 1 wherein the thus produced acidic materials are neutralized, a protective slug is injected into the oil reservoir, thereafter a slug of the thus produced neutralization products is injected into said reservoir and a mobility control slug is injected into said reservoir.

19. A method in accordance with claim 1 wherein the thus produced acidic materials are neutralized and an aqueous solution of the thus produced neutralization products and an electrolyte, in amounts and under conditions to form a microemulsion in situ in the oil reservoir, is injected into said reservoir followed by water.

20. A method in accordance with claim 19 wherein the aqueous solution additionally contains a cosurfactant.

21. A method in accordance with claim 19 wherein a protective slug is injected into the oil reservoir prior to the injection of the aqueous solution.

22. A method in accordance with claim 19 wherein a mobility control slug is injected into the oil reservoir following the injection of the aqueous solution and before the injection of water into said reservoir.

23. A method in accordance with claim 1 wherein a slug of the thus extracted acidic materials is passed through the reservoir in conjunction with an aqueous alkaline solution followed by water.

24. A method in accordance with claim 1 wherein the thus extracted acidic materials are treated with an alkaline material to produce neutralization products thereof, and a slug of an aqueous solution of said neutralization products is passed through the reservoir followed by water.

25. A method in accordance with claim 1 wherein the thus extracted acidic materials are neutralized with an alkaline material to produce neutralization products thereof, a protective slug is passed through the reservoir followed by a slug of an aqueous solution of said neutralization products, followed by a mobility control slug and thereafter by water.

26. A method in accordance with claim 1 wherein the thus extracted acidic materials are neutralized with an alkaline material to produce neutralization products thereof, a slug of an aqueous solution of said neutralization products is passed through such subsurface formation, in amounts and under conditions to form a multiphase microemulsion system in said subsurface formation, followed by water.

27. A method in accordance with claim 26 wherein the aqueous solution additionally contains a cosurfactant.

28. A method in accordance with claim 26 wherein the aqueous solution is preceeded by a protective slug.

29. A method in accordance with claim 26 wherein the aqueous solution is followed by a mobility control slug.

30. A method in accordance with claim 11 wherein the acidic materials are carboxylic acids.

* * * * *

UNITED STATES PATENT AND TRADEMARK OFFICE
CERTIFICATE OF CORRECTION

PATENT NO. : 4,494,604
DATED : January 22, 1985
INVENTOR(S) : James E. Shaw and Paul R. Stapp It is certified that error appears in the above—identified patent and that said Letters Patent are hereby corrected as shown below:

Col. 16, Claim 12, line 54, delete "1" and substitute ---11 ---
Col. 17, Claim 17, line 1, delete "1" and substitute --- 11 ---
Col. 17, Claim 18, line 6, delete "1" and substitute --- 11 ---
Col. 17, Claim 19, line 12, delete "1" and substitute --- 11 ---
Col. 17, Claim 23, line 29, delete "1" and substitute --- 11 ---
Col. 18, Claim 24, line 1, delete "1" and substitute --- 11 ---
Col. 18, Claim 25, line 7, delete "1" and substitute --- 11 ---
Col. 18, Claim 26, line 14, delete "1" and substitute --- 11 ---

Signed and Sealed this

Eighth Day of October 1985

[SEAL]

Attest:

DONALD J. QUIGG

Attesting Officer

Commissioner of Patents and
Trademarks—Designate